United States Patent [19]

Engelhard et al.

[11] 3,852,217

[45] Dec. 3, 1974

[54] METHOD OF REGULATING THE HALOGEN CONTENT OF HYDROCARBON CONVERSION CATALYSTS

[75] Inventors: Philippe Engelhard; Joseph Edouard Weisang, both of Le Havre, France

[73] Assignee: Compagnie Francaise de Raffinage, Paris, France

[22] Filed: Aug. 23, 1972

[21] Appl. No.: 283,062

[30] Foreign Application Priority Data

Aug. 26, 1971 France .............................. 71.31010

[52] U.S. Cl.................. 252/442, 252/441, 208/139
[51] Int. Cl............................................. B01j 11/78
[58] Field of Search............................ 252/441, 442

[56] References Cited
UNITED STATES PATENTS

| | | | |
|---|---|---|---|
| 3,117,076 | 1/1964 | Brennan et al. .............. | 208/139 X |
| 3,216,923 | 11/1965 | Haensel .......................... | 252/441 X |
| 3,239,450 | 3/1966 | Lindquist et al. ................ | 252/441 X |
| 3,511,888 | 5/1970 | Jenkins ........................... | 252/441 X |
| 3,578,584 | 5/1971 | Hayes ............................. | 252/441 X |
| 3,617,510 | 11/1971 | Hayes ............................. | 252/441 X |
| 3,654,184 | 4/1972 | McCallister et al. ........... | 252/441 X |
| 3,702,294 | 11/1972 | Rausch ........................... | 252/441 X |
| 3,725,304 | 4/1973 | Wilhelm........................... | 252/441 |

*Primary Examiner*—Patrick P. Garvin
*Attorney, Agent, or Firm*—Curtis, Morris & Safford

[57] ABSTRACT

Process, and product, for an over-chlorinated hydrocarbon conversion catalyst having a porous support (e.g. alumina) with at least one having metal deposited thereon (e.g. platinum) -- where the catalyst is stabilized by the steps of calcination followed by washing with water (preferably distilled) to remove substantially all water soluble chlorides leaving a chlorine content of between 0.5 and 1.2% (calculated as an element) of the weight of the catalyst and drying.

17 Claims, No Drawings

METHOD OF REGULATING THE HALOGEN CONTENT OF HYDROCARBON CONVERSION CATALYSTS

The present invention relates to an improvement in the preparation of hydrocarbon conversion catalysts. More particularly, it relates to a method which makes it possible to regulate the content of halogenated compounds in said catalysts.

It is known that hydrocarbon conversion catalysts are bifunctional. Namely, they have a cracking function on the one hand and a hydrogenation-dehydrogenation function on the other hand. Such double-function catalysts are generally formed of a porous support of refractory mineral oxide whose acidity confers the cracking function, and of a supported heavy metal of groups V to VIII of the periodic table of elements, in free or combined form, and to which the hydrogenation-dehydrogenation properties are attributed. Recent work has shown that these catalysts which can be improved by deposit of several of the elements belonging to the abovementioned groups to which there can be added the heavy elements of group $IV_A$ (Ge, Sn, Pb).

Such catalysts can be used in numerous reactions, such as isomerization, hydrocracking, hydrocyclization and hydroreforming of hydrocarbon charges.

The beneficial effect of the presence of halogens on the catalytic compositions used in the hydrocarbon conversion processes has been noted. This effect makes itself felt on the acid properties of the catalyst. The halogens, particularly chorine and fluorine, and especially chlorine, can be present in various forms: they can be combined with components of the support on the one hand and/or with elements deposited on the support on the other hand. At present very little is known of the chemical nature of these compounds which are formed.

Upon the starting of a reactor, the chlorine content of a hydroreforming catalyst is generally between 0.1 and 1.5% (calculated as an element) of the weight of the catalyst, and preferably between 0.5 and 1.2%. This content is not constant, and it decreases during the operation of the catalysts. It is necessary to chlorinate the catalyst intermittently during the operation of the reactor, for instance by the admission of gaseous chlorine into the stream of gas.

The halogen present may have been introduced during the preparation of the support. In this way, for instance, one can obtain an aluminum hydroxide gel by the addition of ammonium hydroxide to aluminum chloride, the aluminum hydroxide being then calcined to alumina. The halogen can also be introduced upon subsequent treatment of the support, for instance by contacting of the alumina with circulating hydrochloric acid. Finally, the halogen can be introduced upon the deposit of the hydrogenation-dehydrogenation compounds. One can thus, for instance, deposit platinum by impregnation of the support with a hydrochloric acid solution of hexachloroplatinic acid.

It would appear that the operator is not always the master of the amount of halogen which he deposits during the preparation of the catalyst, or, more precisely, that as this amount is not independent, it is fixed by the values of other parameters, such as the method of preparation of the support or the platinum content. The applicants have now observed that, all other things being equal, the performance of a conversion catalyst depends only on the halogen content thereof, but does not depend on the conventional processes used to introduce said halogen into the composition of the catalyst. It is thus known, for instance, that the optimum content of elementary chloride in hydroreforming catalysts is between 0.5 and 1.2%, and preferably between 0.5 and 0.9%, of the total weight of the catalyst. It is therefore advantageous to be able to adjust the content of elementary halogen in conversion catalysts.

An object of the present invention is to provide a method of regulating the halogen content of hydrocarbon conversion catalysts.

For this purpose one can contemplate either a method of regulating the halogen content by the halogenation of an insufficiently halogenated catalyst, a method of preparing the catalyst which directly produces the optimum halogen content, or else the dehalogenation of an overly halogenated catalyst.

The applicants have shown that dehalogenation is a simple process which produces excellent results.

The dehalogenation of catalysts has already been described in the three following U.S. Pat. Nos. 3,239,450, 3,523,912 and 3,189,559.

U.S. Pat. No. 3,239,450 concerns the preparation of a hydrocarbon conversion catalyst in which an activated support containing alumina or magnesia is contacted with an aqueous solution of a fluoride of a metal having hydrogenating-dehydrogenating properties (preferably nickel). In one embodiment of the invention, the fluorides which are not chemisorbed on the support are extracted with water.

U.S. Pat. No. 3,523,912 concerns a method of preparing a hydrocarbon conversion catalyst which consists in the coprecipitation of the components of the catalyst. The catalyst prepared has a low chlorine content (less than 0.25%). This content can be obtained by washing and ion exchange, effected on the wet coprecipitate.

U.S. Pat. No. 3,189,559 concerns the complete dechlorination of a catalyst containing platinum or alumina by causing a solution of ammonia to move over it.

The processes described in these patents do not include the treatment which is best adapted to regulating the halogen content of the hydrocarbon conversion catalysts.

A preferred embodiment of the present invention is a method of regulating the halogen content of a hydrocarbon conversion catalyst prepared by impregnation of a support with at least one solution containing at least one element to be deposited on the support, said process comprising subjecting the catalyst to calcining, followed by washing with water and drying.

The extraction of the halogen by liquid water can be carried out by various means. If one operates at atmospheric pressure, it is necessary to select a contact temperature of between 30°C and 100°C, since below 20°C the rate of extraction is very low. If one operates at a pressure greater than atmospheric pressure, it is then possible to effect the extraction at a temperature greater than 100°C, which increases the rate of extraction of the halogen and therefore makes it possible to decrease the time of contact necessary for the extraction.

The duration of the extraction depends on the temperature at which it is carried out and also on the ratio of the volume of water to the volume of catalyst in contact. The extraction can be contained until the content of extracted halogen ions in the extraction liquid no longer changes.

It is advantageous to use as wash water a water which does not contain the ions extracted; as wash agent one can use, for instance, condensed steam obtained after a distillation of the water coming from the washing of the catalyst.

The carrying out of the method of the invention leads to catalysts whose final halogen content in the catalyst is less than the initial content. Nevertheless it is not possible to extract the entire fixed amount of halogen. The applicant has found - and this result is entirely surprising - that for the same halogen content, the catalyst of greatest stability is the one for which this content is obtained after an extraction treatment in accordance with the invention. A catalyst in connection with which this same halogen content has been obtained directly, that is to say without extraction, always exhibits poorer behavior with the passage of time. This result is entirely unexpected and is to be compared with the observations made by the applicant on catalysts prepared by conventional means, that is to say without dehalogenation phase.

This finding suggests the following explanation:

The halogenated compounds present on the catalyst are of various kinds; only those which are capable of being hydrolyzed, such as aluminum chloride, are extracted by washing. This explanation is confirmed by the results of the determinations set forth in Example III which will be described below.

The process of the invention can be used on any hydrocarbon conversion catalyst, and in particular on hydroreforming catalysts. The following examples which relate to hydroreforming catalysts formed of platinum and another metal in free or combined form, which are deposited on alumina, do not constitute limitations on the invention either with respect to the support or with respect to the hydrogenating-dehydrogenating compound, nor with respect to the third component which may perhaps not be present or may be replaced by another metal or various other metals.

EXAMPLE I

PREPARATION OF THE CONTROL CATALYSTS T1 and T2

Alumina is available in the form of extruded particles having the following characteristics:

| | |
|---|---|
| Average diameter of the extruded particles | 1.5 mm |
| Specific surface | 190 m²/g |
| Pore volume | 0.51 cm³/g |
| Average radius of the pores | 53 A |

This alumina is calcined for 4 hours at 600°C. 100 g of this alumina is contacted with 125 cc of a solution containing 10 cc of nitric acid and 0.380 g of stannous chloride dihydrate. It is placed in a rotary evaporator, dried at 120°C and then calcined at 600°C for 2 hours. The solid obtained is divided into two equal portions:

The first portion is immersed in 125 cc of a circulating solution containing:
  11.25 cc of normal nitric acid,
  13.75 cc of normal hydrochloric acid 18.8 cc of hexachloroplatinic acid solution containing 9.31 g/l of platinum.

After 2 hours of circulation of the solution, its platinum is exhausted. The catalyst is centrifuged, dried, and then calcined at 400°C for 3 hours. There is obtained a catalyst T1 the analysis of which, after a reductive treatment consisting in passing a stream of hydrogen over the catalyst for 2 hours at 500°C, gives the following composition, expressed as elements, referred to the total weight of the catalyst:

| | | |
|---|---|---|
| | platinum | 0.35% |
| T1 | tin | 0.21% |
| | chlorine | 0.91% |

The second portion is immersed in 125 cc of a circulating solution containing:
  25 cc of normal hydrochloric acid,
  18.8 cc of hexachloroplatinic acid solution containing 9.31 g/l of platinum.

After the solution has circulated for 2 hours, a series of treatments are carried out which are identical to those described with respect to the catalyst T1. There is obtained a catalyst T2 having the following composition:

| | | |
|---|---|---|
| | platinum | 0.35% |
| T2 | tin | 0.21% |
| | chlorine | 1.14% |

PREPARATION OF CATALYST A

A fraction of the catalyst T2, equal to 25 g, which has not undergone a reduction by hydrogen is introduced into a cartridge of a Soxhlet apparatus. The volume of distilled water serving as extraction agent for the elementary chlorine is equal to 200 cc. The extraction is effected for 24 hours, the average temperature of the water in contact with the catalyst being equal to about 50°C.

After drying, the catalyst obtained is reduced for 2 hours by a stream of hydrogen at 500°C. There is obtained a catalyst A having the following composition:

| | | |
|---|---|---|
| | platinum | 0.35% |
| A | tin | 0.21% |
| | chlorine | 0.92% |

CATALYTIC TEST 25 cc of catalyst are placed in a stainless steel reactor. A stream of pure, dry hydrogen is passed over the catalyst for 2 hours, the temperature of the catalyst being maintained at 500°C and the pressure within the reactor being maintained at 7 bars. Thereupon, the temperature being increased to 510°C, the charge consisting of n-heptane is introduced with a liquid hourly space volocity of 2 and a ratio of the number of mols of hydrogen introduced to the number of mols of n-heptanes introduced of 5.

Samples taken from the efflux of the reactor make it possible to determine on the one hand the liquid yield by simple weighing and on the other hand the equivalent octane number of the liquid by the application, to chromatographic analyses of the liquid, of the ASTM mixture numbers contained on nomograms.

The curve of the decrease of the octane number as a function of time is a straight line. The slope of this line is therefore a faithful representation of the stability of the catalyst.

The results obtained upon subjecting catalysts T1, T2 and A to the test which has just been described are set forth in Table I:

TABLE I

| Catalyst | Initial chlorine content | Octane points lost in 100 hours | Average yield | Chlorine content after test |
|---|---|---|---|---|
| T1 | 0.91% | 9.5 | 67.9 | 0.82 |
| T2 | 1.14% | 10.7 | 61.3 | 0.91 |
| A | 0.92% | 5.7 | 64.8 | 0.86 |

Table I shows that catalyst A, obtained by the method of the invention is the most stable of the three catalysts tested. It is noted in particular that it is more stable than catalyst T1 whose chlorine content is practically the same.

EXAMPLE II

PREPARATION OF THE CONTROL CATALYSTS T3 and T4

With an alumina identical to the one described in Example I there are deposited on it, after calcining for 4 hours at 600°C, in succession tin and platinum under conditions identical to those described in Example I, except with regard to the amount of stannous chloride dihydrate contained in the first impregnation solution, which is equal to 0.27 g.

Two control catalysts are obtained having the following compositions:

| | | |
|---|---|---|
| T3 | platinum | 0.35% |
| | tin | 0.15% |
| | chlorine | 1.02% |
| T4 | platinum | 0.35% |
| | tin | 0.15% |
| | chlorine | 1.30% |

PREPARATION OF CATALYST B

A fraction of the catalyst T4 which has not been subjected to the reduction by hydrogen is subjected to an extraction by liquid water in a Soxhlet apparatus in accordance with the method described in Example I.

The catalyst B obtained after drying and reduction at a temperature of 500°C by a stream of hydrogen for 2 hours has the following composition:

| | | |
|---|---|---|
| B | platinum | 0.35% |
| | tin | 0.15% |
| | chlorine | 0.95% |

CATALYTIC TEST

The test carried out on the three catalysts T3, T4 and B under the conditions set forth in Example I leads to the results contained in Table II.

TABLE II

| Catalyst | Initial chlorine content | Octane points lost in 100 hours | Average yield | Chlorine content after test |
|---|---|---|---|---|
| T3 | 1.02 | 12.1 | 68.3 | 0.82 |
| T4 | 1.30 | 26.0 | 67.8 | 1.00 |
| B | 0.95 | 10.3 | 70.9 | 0.84 |

It is noted that catalyst B of the invention is the most stable of the three catalysts, and that in particular, for a similar chlorine content, the catalyst B is more stable than catalyst T3.

EXAMPLE III

A catalyst $T_5$ is prepared by a method similar to that employed in Example I for obtaining catalyst $T_2$.

Catalyst $T_5$ has the following composition after calcining in air at 400°C:

| | | |
|---|---|---|
| $T_5$ | platinum | 0.35% |
| | tin | 0.20% |
| | chlorine | 1.65% |

25g of this catalyst are placed in the cartridge of a Soxhlet apparatus which contains 250 cc of distilled water. The treatment lasts for 24 hours. The extraction liquid is then concentrated to 100 cc.

The determinations of chlorine (by gravimetry) and of aluminum (volumetry in the presence of ethylene diamine tetra-acetic acid EDTA) present in the extraction liquid give 1.84 g/l of chlorine and 0.46 g/l of aluminum respectively, which corresponds to a molar ratio of chlorine to aluminum of 3.04 (as compared with 300 for the theoretical value in Al $Cl_3$).

0.73% of the chlorine has been extracted (1.84 × 100/250) and 1.65 − 0.73 = 0.92% should therefore remain on the catalyst; analysis gives 0.95%, which value is in good agreement and confirms the dissolving of Al $Cl_3$ by washing.

EXAMPLE IV

PREPARATION OF CONTROL CATALYST $T_6$

An alumina is used identical to that described in Example I. After it has been calcined at 600°C for 4 hours, it is immersed in a hydrochloric acid solution of chloroplatinic and perrhenic acids. The mixture is placed in a rotary evaporator. The product obtained is dried at 120°C, and then calcined in air at 530°C for 2 hours. The product obtained is divided into two portions.

One portion of the product obtained is subjected to a reductive treatment consisting in passing hydrogen over it for 2 hours at 500°C.

Catalyst $T_6$ is obtained, the composition of which by weight is as follows:

| | | |
|---|---|---|
| $T_6$ | platinum | 0.33% |
| | rhenium | 0.20% |
| | chlorine | 1.18% |

PREPARATION OF CATALYST C

The second portion is subjected to extraction by liquid water in a Soxhlet apparatus in accordance with the method described in Example I.

The catalyst C obtained after drying and reduction at a temperature of 500°C by a stream of hydrogen for 2 hours has the following composition:

| | | |
|---|---|---|
| C | platinum | 0.33% |
| | rhenium | 0.20% |
| | chlorine | 0.85% |

CATALYTIC TEST

The test on the catalysts were carried out under conditions similar to those described in Example I. These tests were carried out for two pairs of values of the pressure and liquid hourly volumetric velocity (v.v.h.), namely 7 bars - 2 vvh, and 14 bars - 1 vvh respectively, all other things being equal.

The results are set forth in Table III which appears at the end of Example V.

EXAMPLE V

PREPARATION OF THE CONTROL CATALYST $T_7$

An alumina is used identical to that described in Example I. After it has been calcined at 600°C for 4 hours, it is immersed in a germanium chloride (Ge Cl$_4$) solution in absolute alcohol acidified by HCl. This solution is evaporated in a rotary evaporator, dried at 120°C and then calcined at 600°C for 2 hours.

The product obtained is then subjected to circulation of 1 N HCl for 24 hours and then dried. The resultant product is subjected to the circulation of a hydrochloric acid solution of hexachloroplatinic acid until the platinum contained in the solution has been exhausted. The catalyst is dried and calcined for 3 hours at 530°C. The product obtained is divided into two portions.

The first portion is subjected to a reductive treatment by passage of hydrogen at 500°C for 2 hours. There is obtained a catalyst $T_7$ having the following composition:

| | | |
|---|---|---|
| $T_7$ | platinum | 0.37% |
| | germanium | 0.14% |
| | chlorine | 1.36% |

PREPARATION OF CATALYST D

The second portion is subjected to extraction by liquid water in a Soxhlet apparatus in accordance with the method described in Example I.

The catalyst D obtained after drying and reduction at 500°C for 2 hours in a stream of hydrogen has the following composition:

| | | |
|---|---|---|
| D | platinum | 0.37% |
| | germanium | 0.14% |
| | chlorine | 0.88% |

CATALYTIC TEST

The tests on the catalyst are carried out under conditions identical to those described in Example IV. The results are given in Table III.

It is noted that the catalysts C and D in accordance with the invention systematically produce an improvement in the average yield without deterioration (and with an improvement in the case of C) of the stability with time.

TABLE III

| | Catalysts | Initial chlorine content (%) | Octane points lost in 100 hrs | Average yield | Chlorine content after test (%) |
|---|---|---|---|---|---|
| 7 bars 2 vvh | $T_6$ | 1.18 | 13 | 70.3 | 0.37 |
| | C | 0.85 | 7.9 | 75.7 | 0.54 |
| | $T_7$ | 1.36 | 2.8 | 64.4 | 1.05 |
| | D | 0.88 | 2.8 | 68.1 | 0.85 |
| | $T_6$ | 1.18 | 2.5 | 44.3 | 0.84 |
| | C | 0.85 | 1.3 | 52.6 | 0.49 |
| 14 bars 1 vvh | $T_7$ | 1.36 | 0.9 | 47 | 1.20 |
| | D | 0.88 | 0.9 | 51.4 | 0.86 |

EXAMPLE VI

PREPARATION OF THE CATALYSTS $T_8$, $T_9$ and E

Three catalysts $T_8$, $T_9$ and E are prepared under conditions similar to those described in Example I for the catalysts $T_1$, $T_2$ and A respectively. The catalysts obtained have the following compositions:

| | | |
|---|---|---|
| $T_8$ | platinum | 0.36% |
| | tin | 0.21% |
| | chlorine | 0.92% |
| $T_9$ | platinum | 0.37% |
| | tin | 0.20% |
| | chlorine | 1.33% |
| E | platinum | 0.37% |
| | tin | 0.20% |
| | chlorine | 0.89% |

CATALYTIC TEST

The three catalysts thus prepared are then tested in identical parallel tests carried out on 100 cc of catalyst under the following operating conditions:

| | |
|---|---|
| vvh of the liquid charge | 1.4 |
| total pressure in the reactor | 15.5 bars |
| ratio of the number of mols introduced, hydrogen/charge | 6 |

The hydrocarbon charge has the following properties:

| | |
|---|---|
| ASTM initial boiling point | 68°C |
| temperature at which 50% of the volume is distilled | 105°C |
| ASTM final boiling point | 144°C |
| density measured at 20°C | 0.715 |
| Components by volume: | |
| paraffin hydrocarbons | 68% |
| naphthenes | 25% |
| aromatics | 7% |

After reduction of the catalyst in a stream of pure hydrogen at a temperature of 510°C, the temperature is lowered to 370°C, at which temperature the hydrocarbon charge is introduced gradually, while the temperature is increased, also gradually, until the operating conditions mentioned above are satisfied for a research octane number of the liquid fraction (without addition of tetraethyl lead) of 98. For the entire duration of the test, this severity is retained by increasing the temperature if necessary.

In Table IV there have been set forth for values in hours of the time of the tests (without interruption) the values of the yield in hydrocarbons having five or more than five carbon atoms ($C_5+$), expressed by volume with respect to the charge introduced, and the ratio of the volume of hydrogen formed (expressed in liters measured under normal conditions) to the volume of charge introduced (measured in liquid state at 20°C and expressed in liters).

TABLE IV

| Catalysts | $T_9$ | | E | | $T_8$ | |
|---|---|---|---|---|---|---|
| Number of hours of operation | 306 | 618 | 332 | 641 | 330 | 642 |
| Yield $C_5+$ (%) | 66 | 64 | 71,6 | 69,4 | 67,4 | 66,2 |
| Yield $H_2$ (l/l) | 142 | 123 | 153 | 141 | 148 | 136 |

This table shows the advantages of catalyst E over the catalysts $T_8$ (of a composition substantially equivalent to that of E but not subjected to an extraction) and $T_9$.

We claim:

1. A chlorine-stabilized hydrocarbon conversion catalyst consisting essentially of a chlorinated support, said support being a porous refractory oxide, and platinum deposited on said support by impregnation with a solution containing platinum, said catalyst having been over-chlorinated during the impregnation step, thereafter calcinated and then washed with liquid water to remove substantially all the water-extractable chlorides to leave a more stabilized final chlorine content of between 0.5 and 1.2% of the weight of the catalyst, where the percentage of chlorine is calculated on the basis of the elemental form.

2. A catalyst as claimed in claim 1, wherein said final content is between 0.5 and 0.9%.

3. A chlorine-stabilized hydrocarbon conversion catalyst consisting essentially of a chlorinated support; said support being a porous refractory oxide; platinum, and an additional component chosen from the group consisting of tin, germanium and rhenium, deposited on said support by impregnation with at least a solution containing at least one element to be deposited on the support; said catalyst having been over-chlorinated during the impregnation step; thereafter calcinated and then washed with liquid water to remove substantially all the water-extractable chlorides to leave a more stabilized final chlorine content of between 0.5 and 1.2% of the weight of the catalyst, where the percentage of chlorine is calculated on the basis of the elemental form.

4. A catalyst as claimed in claim 3, wherein said final chlorine content is between 0.5 and 0.9%.

5. A chlorine-stabilized hydrocarbon conversion catalyst consisting essentially of a chlorinated support; said support being a porous refractory oxide; platinum, and two additional compounds chosen from the group consisting of tin, germanium and rhenium, deposited on said support by impregnation with at least a solution containing at least one element to be deposited on the support; said catalyst having been over-chlorinated during the impregnation step; thereafter calcinated and then washed with liquid water to remove substantially all the waterextractable chlorides to leave a more stabilized final chlorine content of between 0.5 and 1.2% of the weight of the catalyst, where the percentage of chlorine is calculated on the basis of the elemental form.

6. In a process for the preparation of a hydrocarbon conversion catalyst which consists essentially of a chlorinated porous support of a refractory oxide and platinum and consisting essentially of impregnating said support with a solution containing at least one element to be deposited on the support and then calcinating the impregnated support; the improvement for stabilizing the chloride content of the catalyst consisting essentially of over-chlorinating said catalyst originally, washing said catalyst with water in liquid form subsequent to said calcinating to extract chlorides, then drying said catalyst.

7. In a method according to claim 6, wherein the washing is carried out above 100°C at a pressure greater than atmospheric pressure.

8. In a method according to claim 6, wherein the catalyst is fixed, while the water circulates.

9. In a method according to claim 6, wherein the water is purified by distillation before it is contacted with the catalyst.

10. In a method according to claim 6, wherein the chlorine content of said catalyst is between 0.5 and 0.9%.

11. In a method according to claim 6, wherein the improvement further comprises sufficiently over-chlorinating such that the subsequent washing removes substantially all of the accessibly hydrolyzable chloride compounds from said catalyst so as to reduce the chlorine content thereof to between 0.5 and 1.2% of the weight of the catalyst, when the percentage is calculated as if in elemental form.

12. In a method according to claim 11, wherein the support contains alumina and the platinum is deposited from a chloroplatinic acid solution.

13. In a method according to claim 11 wherein the catalyst comprises a support which is alumina.

14. In a method according to claim 13, the improvement wherein said catalyst additionally contains tin.

15. In a method according to claim 13, the improvement wherein said catalyst additionally contains germanium.

16. In a method according to claim 13, the improvement wherein said catalyst additionally contains rhenium.

17. In a method according to claim 13, wherein the said catalyst additionally contains two additional metals chosen from the group consisting of tin, germanium, and rhenium.

* * * * *

UNITED STATES PATENT OFFICE
CERTIFICATE OF CORRECTION

Patent No. 3,852,217            Dated  December 3, 1974

Inventor(s) Philippe Engelhard and Joseph Edouard Weisang

It is certified that error appears in the above-identified patent and that said Letters Patent are hereby corrected as shown below:

Column 9,
Claim 2, line 34 after "final" insert --chlorine--.

Signed and sealed this 11th day of February 1975.

(SEAL)
Attest:

RUTH C. MASON
Attesting Officer

C. MARSHALL DANN
Commissioner of Patents
and Trademarks